United States Patent Office 3,464,722
Patented Sept. 2, 1969

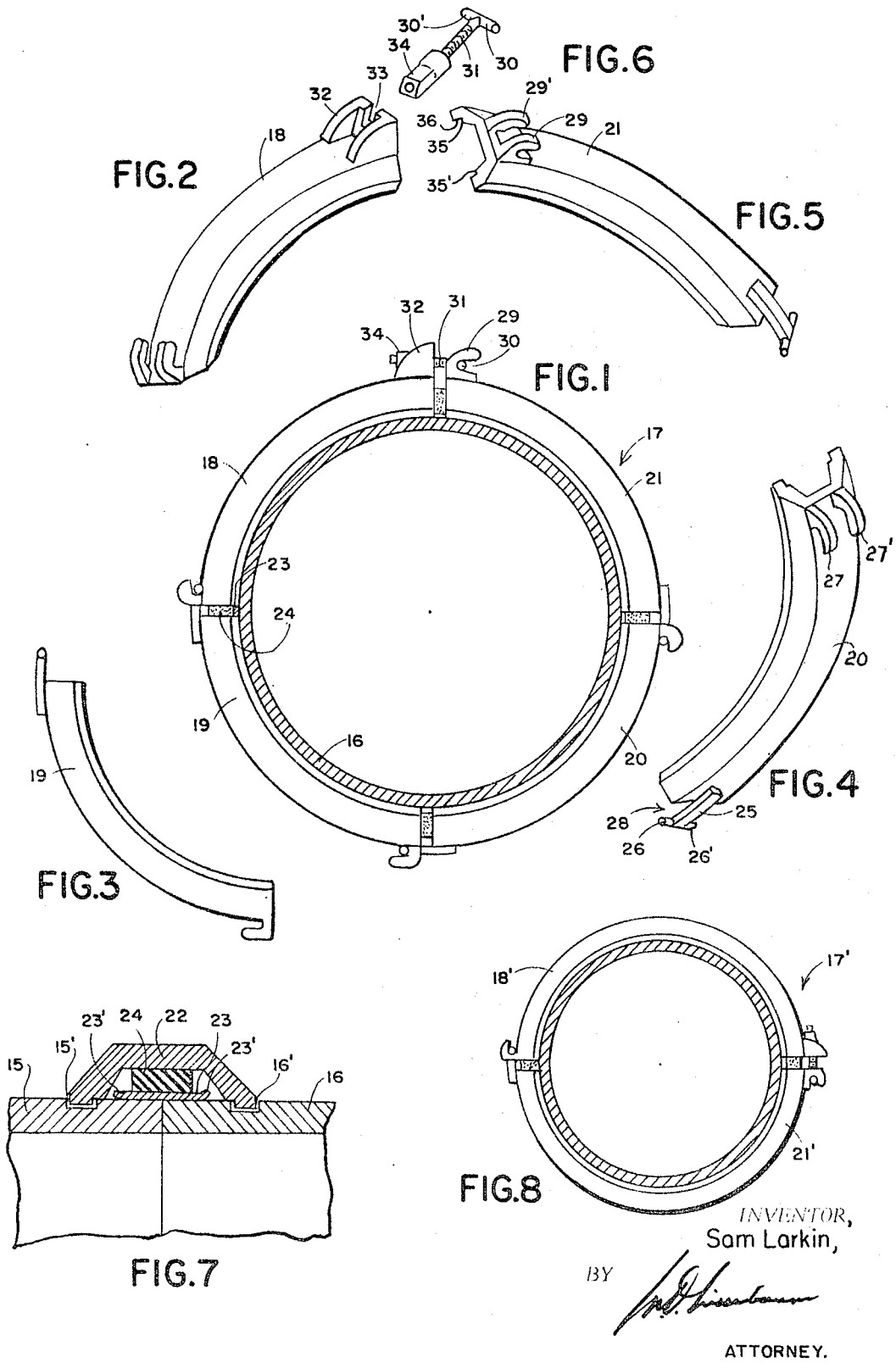

3,464,722
PIPE COUPLING HAVING SEGMENTED
CLAMPING MEANS
Sam Larkin, 254 Beach 140th St.,
Belle Harbor, N.Y. 10013
Filed Apr. 19, 1968, Ser. No. 722,765
Int. Cl. F16l 21/02, 21/06
U.S. Cl. 285—367          8 Claims

ABSTRACT OF THE DISCLOSURE

A coupling for abutting lengths of pipe, which is a clamping ring structure consisting of two or more successive arcuate segments totalling nearly 360 degrees; the juncture of adjacent ends of which is effected by hooks on the end of one segment engaging aligned trunnions on a bar extending from the end of the segment next to it, with provision to connect the ends of the end segments to close the ring and contract it to tightly embrace the pipes. The segments are made of lengths cut from rolled channel stock, bent for instance by hydraulic pressure means. The trunnions are engaged by the hooks in rotatable fitted relation and lie tangent to the outer peripheral surface of the segment they are respectively hooked onto. Each bar carrying trunnions fits slidably between hooks to maintain the segments in circumferential alignment. A rubber ring on a soft lead sleeve, having flared ends to facilitate its mounting to overlap the pipes, is positioned within the channeled ring structure, to be compressed upon the contraction of the coupling about the pipes it joins. These couplings may be assembled at the site of laying the piping.

SPECIFICATION

The present invention relates to and its principal object is to provide novel and improved pipe couplings of the segmental type, affording simplicity of structure and economy in manufacture. Also, they are easy to assemble at the site of use, easy to mount and remove, and efficient in accomplishing leakproof and effective junctions.

A further object is to provide novel and improved pipe couplings of the segmented type, whose parts are fabricated from rolled steel channel stock, instead of being cast, thereby making the coupling of great strength, and obviates machining to attain trueness of curvature.

Other objects and advantages will become apparent as this disclosure proceeds.

For one practice of this invention, the pipe coupling consists of a number of successive arcuate segments in spaced relation, which of themselves total nearly 360 degrees; the juncture of adjacent ends of successive segments being effected by hooks welded on the outer arcuate surface of one segment for engaging a trunnion on an arm extending from the other segment; said arm fitting between said hooks to assure proper alignment. This arrangement is on all segments except those which are the ends of the series constituting the ring to encircle the pipe ends to be encompassed. These coupling ends are joined and drawn together by a bolt having a trunnion at head end and a usual nut, engaging formations on the meeting ends of said end segments. Rubber packing rings having lead liners are provided in these coupling devices to attain leakproof condition, as will be explained. The arcuate components are formed by hydraulic press operation on lengths cut from rolled steel channel stock.

In the accompanying drawing forming part of this specification, similar characters of reference indicate corresponding parts in all the views.

FIG. 1 is an elevational view of a pipe coupling in assembled use condition joining the ends of two aligned lengths of pipe, in accordance with the teachings of this invention. This coupling comprises four segments.

FIG. 2 is a perspective view of one of the end segments.

FIG. 3 is a side view of one of the intermediate segments.

FIG. 4 is a perspective view of the other intermediate segment which is identical with that shown in FIG. 3.

FIG. 5 is a perspective view of the other end segment.

FIG. 6 shows a bolt and nut for use in connecting the end segments and contract the ring forming the pipe coupling of FIG. 1.

FIG. 7 is an enlarged section taken at line 7—7 in FIG. 1.

FIG. 8 is like FIG. 1, drawn to a reduced scale, showing a coupling composed of only two segments.

In the drawing, the coupling for the abutting pipe lengths 15 and 16, is designated generally by the numeral 17, which comprises in the embodiment illustrated in FIG. 1, four arcuate segments in end to end association. Of course, the ring structure is left open so it can be applied, and then the end segments 18 and 21 are dealt with to close and contract the ring. The intermediate segments 19 and 20 are identical. Said segments are preferably made of equal lengths cut from rolled channel stock having the transverse cross section as indicated at 22, and said lengths are bent into circular arc form of a bit less than ninety degrees by hydraulic press means. The pipes 15 and 16 are provided near their abutting ends with annular grooves as at 15' and 16', respectively, in which set the longitudinal edges of the side walls of the channel forms. Preferably, a lead sleeve 23 having flared ends 23' is provided to overlap the abutting ends of the pipe lengths and carry a resilient rubber ring 24 which is of sufficient thickness to be substantially compressed when the coupling 17 is fully assembled and properly tightened about the juncture. The use of the lead liner for the rubber ring assures a leakproof joint. In assembly, the segments are slightly spaced so that ring girth is 360 degrees. Of importance to note is the manner of association of adjacent segments, which will now be described.

All of the segments have fittings welded onto their outer peripheral surfaces to accomplish their assembly into a ring. For such purpose, the intermediate segments which can be identical, each have a bar 25 along it centrally placed and extending beyond one of its ends, the distal end of which bar, terminates in oppositely extending aligned pintles or trunnions 26, 26' which are parallel to the ring's axis. On the other end of each intermediate segment is a pair of hook formations afforded by the elements 27, 27' which are opposite each other in spaced relation across the segment's outer periphery. The bight of each of these hooks is adapted to receive a trunnion which can revolve therein. The trunnion-provided bar unit is indicated generally by the numeral 28. The width of the bar 25 is such that when the trunnions are engaged in the hooks, said bar is slidably fitted between said hooks, and so adjacent segments are kept in circumferential alignment. The meeting ends of the end segments 18 and 21 are provided with means which can be held together and drawn towards each other to contract the ring structure when about the pipe joint. One such arrangement is to have the hooks 29, 29' on the segment 21 for engagement of the aligned oppositely extending trunnions 30, 30' which are at the head end of a bolt 31, while the segment 18 is provided with the bifurcation 32 which is adapted to receive the bolt 31 through the notch 33; said bolt carrying a nut 34 which can be turned by a socket wrench. When the coupling as 17' comprises only two segments 18', 21', their structure is respectively akin to that of 18 and 21, except that each is nearly a half circle.

The closer the trunnions are to the outer periphery of the segment they hook onto, the tighter clamping action is afforded the coupling on the pipes associated and there is less bending action on the bar carrying the trunnions. For optimum results in these matters, the said bar is formed with the general curvature of the coupling ring, and the trunnions are tangent to said outer peripheral surface. Such tangency is not attained by the trunnions 30, 30' because clearance is required for the nut 34.

The rubber ring 24 in the assembly is highly compressed and transmits substantial pressure on its soft lead liner 23 to press its wall into irregular crevices which may exist in the pipe end abutment plane. Also to be noted in the embodiments shown, is that each of the opposite inner wall surfaces of the channel stock of the segments has a downward step, as shown as 35, 35' respectively, the height of whose risers as 36 is a bit less than the depth of the groove in the pipe so that when the lead and rubber components are properly compressed and the coupling is tight, the steps 35, 35' will stop against the respective pipes 15, 16, and the channel will be spaced from the floors of said grooves 15', 16'.

It is evident that a multitude of sets of coupling components may be brought in separated condition to the site of pipe installation, and assembled and mounted as needed, or if desired, said couplings may be assembled at the factory and maintained as open "bracelets" by peening the tip ends of the hooks to keep their associated trunnions assembled therewith, so all the metal parts of the coupling form a unitary structure.

This invention is capable of numerous forms and various applications without departing from the essential features herein disclosed. It is, therefore, intended and desired that the embodiments shown herein shall be deemed illustrative and not restrictive.

I claim:
1. In a pipe coupling of the contractible clamping ring type which is initially in open condition presenting two free ends to be connected and drawn towards each other comprising: a plurality of successive, pivotally associated, spaced arcuate segments, adapted when opened to be positioned to overlap and encircle the abutting end regions of pipes, each of which has a external groove spaced a predetermined distance from one end thereof, a bar secured to and extending from the end of the first of said segments, towards and over the second of said segments; the distal end of said bar having a pair of oppositely directional trunnions extending therefrom parallel to the ring axis, and a pair of elements extending from the second of said pair of adjacent segments and spaced thereacross, forming hooks in which said trunnions are rotatably engaged respectively; said bar fitting slidably between said hooks whereby said segments are maintained in peripheral alignment, means for drawing the free ends of said segments toward each other, said means including a nut and a headed bolt adapted for threaded engagement, and formations on the free ends of said segments for receiving said nut and bolt, said segments being of channel form which open inwardly; said channel having opposite walls and a bottom wall between said opposite walls; the inner surface of each of said opposite walls of the channel having a step therealong its entire length towards the channel bottom wall; said steps determining one cylindrical surface, a resilient ring surrounding the abutting pipe ends and being in contact with the bottom wall of said segments, said resilient ring having a constant inner diameter, a soft metal liner within said resilient ring and being compressed upon contraction of the coupling to sealingly engage the pipe end regions, the cylindrical surfaces of said steps engaging the outer peripheral wall of said pipes adjacent said grooves and the inner edges of said opposite walls being radially spaced from the bottom walls of said grooves when the coupling is tightly mounted on said pipes.

2. A pipe coupling as defined in claim 1, wherein the trunnions are removable from the hooks engaging them, whereby the segments are separable.

3. A coupling as defined in claim 1, wherein each bar is centrally positioned along the segment it extends from.

4. A pipe coupling as defined in claim 1, wherein the trunnions are tangent to the outer surface of the second segment of each said pair.

5. A pipe coupling as defined in claim 4, wherein the said bars are concentric in relation to the segments they are on, respectively.

6. A pipe coupling as defined in claim 5, wherein the thickness of each bar is equal to the diameter of the trunnions.

7. A pipe coupling as defined in claim 1, wherein the ends of said liner are flared.

8. A pipe coupling as defined in claim 1, wherein the number of segments is at least four; all intermediate segments being substantially identical so they can be interchanged; each having a bar and its trunnions at one end, and the hook-forming elements at its other end.

References Cited
UNITED STATES PATENTS

| | | | |
|---|---|---|---|
| 847,620 | 3/1907 | Thompson | 24—284 |
| 857,134 | 6/1907 | Wilcox | 277—235 X |
| 940,510 | 11/1909 | Carnahan et al. | 285—365 X |
| 1,976,797 | 10/1934 | Naylor | 277—101 X |
| 2,882,071 | 4/1959 | Klompar | 285—409 |
| 3,329,446 | 7/1967 | Katis et al. | 285—112 |

FOREIGN PATENTS

| | | |
|---|---|---|
| 1,196,266 | 5/1959 | France. |
| 736,879 | 9/1955 | Great Britain. |

THOMAS F. CALLAGHAN, Primary Examiner

U.S. Cl. X.R.

24—284; 277—101, 235